(No Model.) 2 Sheets—Sheet 1.
H. WEICHERT.
MACHINE FOR CUTTING DOUGH.
No. 598,404. Patented Feb. 1, 1898.
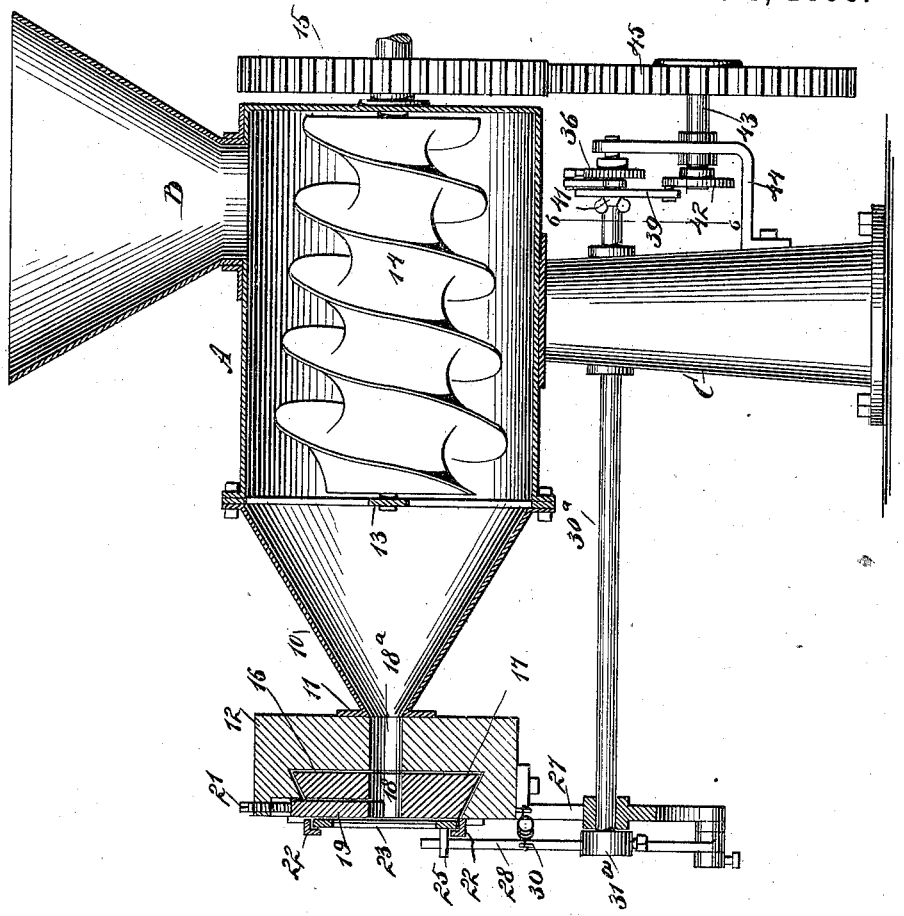
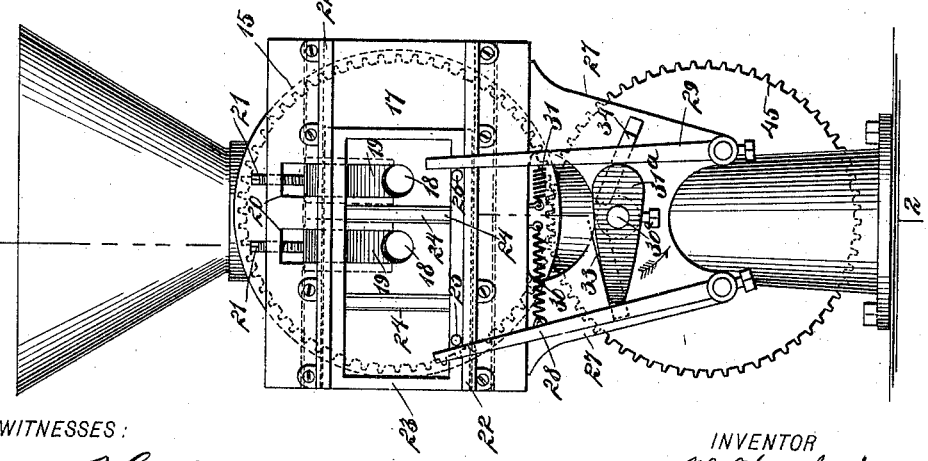
WITNESSES:
William P. Goebel.
INVENTOR
H. Weichert.
BY 
ATTORNEYS.

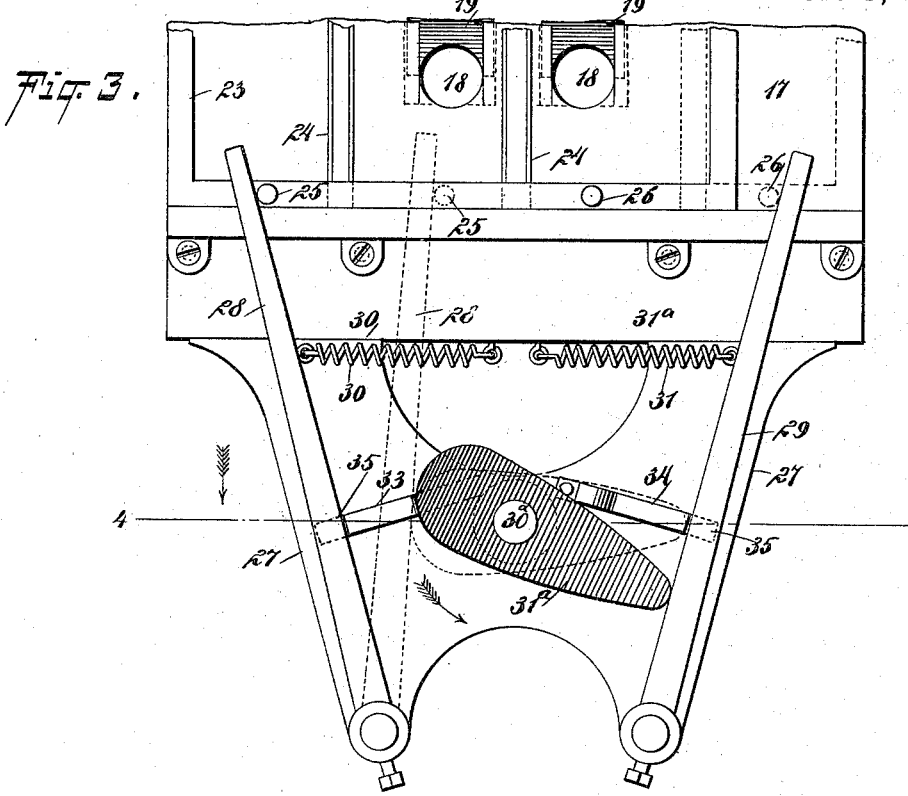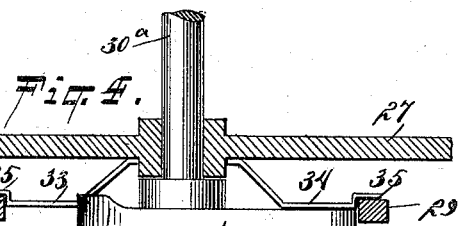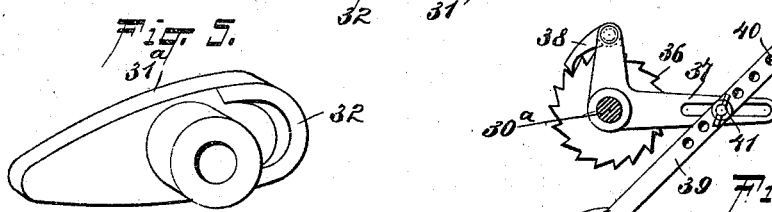

UNITED STATES PATENT OFFICE.

HERMAN WEICHERT, OF JERSEY CITY, NEW JERSEY.

MACHINE FOR CUTTING DOUGH.

SPECIFICATION forming part of Letters Patent No. 598,404, dated February 1, 1898.

Application filed August 13, 1897. Serial No. 648,138. (No model.)

*To all whom it may concern:*

Be it known that I, HERMAN WEICHERT, of Jersey City, in the county of Hudson and State of New Jersey, have invented certain new and useful Improvements in Machines for Cutting Dough, of which the following is a full, clear, and exact description.

The object of my invention is to provide a machine through the medium of which dough may be cut into pieces for loaves in such manner that each piece or loaf will have the required and predetermined weight and, furthermore, to construct the machine in such manner that the dough need simply be fed to the machine, and whereby the dough will be automatically expelled from the machine and cut to the required weight.

Another object of the invention is to provide an adjustment whereby the weight of the dough delivered by the machine may be increased or decreased above and below a given standard of weight and to construct a machine from which any plastic material may be fed and cut off into parcels or pieces of any desired shape or weight.

The invention consists in the novel construction and combination of the several parts, as will be hereinafter fully set forth, and pointed out in the claims.
Reference is to be had to the accompanying drawings, forming a part of this specification, in which similar characters of reference indicate corresponding parts in all the figures.

Figure 1 is a front elevation of the machine.
Fig. 2 is a vertical section on the line 2 2 of Fig. 1. Fig. 3 is an enlarged view of a portion of the front of the machine. Fig. 4 is a section taken horizontally on the line 4 4 of Fig. 3. Fig. 5 is a detail perspective view of the cam which controls the movement of the cutters; and Fig. 6 is a section on the line 6 6 of Fig. 2, showing in detail a device for regulating the throw of the cam.

A casing A, preferably of cylindrical form, is adapted to receive the material which is fed thereto through a hopper B, and the cylinder is usually supported on a standard C. The cylinder or receptacle A is provided with a tapering nozzle 10 at its forward end, which is contracted at its outlet, and the said outlet may be made as wide or as narrow as desired. At the outlet end of the nozzle 10 a block 12 is secured through the medium of a flange 11 or its equivalent, and the said block may be supported from the floor also, if so desired.

Where the nozzle 10 connects with the body of the cylinder or receptacle, a spider 13 is usually secured. One end of a feed-screw 14 is journaled in this spider, the opposite end extending through the rear portion of the receptacle, the said rear end having a gear 15 attached thereto. In the front face of the block or head 12 a dovetail groove 16 is made, in which a similarly-shaped slide 17 has movement, the outer face of the slide being preferably flush with the outer face of the head. The slide may have one or two openings 18 made therein, two openings being shown in the drawings, and these openings 18 register with openings 18ª, made in the head, the openings 18ª communicating with the nozzle 10. The openings 18 are produced partially in the body of the slide 17 and partially in vertically-disposed gates 19, having end movement in suitable openings 20, produced in the slide 17, as shown in Fig. 1, the adjustment of the gates 19 being regulated through the medium of screws 21 or their equivalents. Under this construction the openings 18 may be made large or small, and the quantity of material which is to pass out through the openings may be controlled.

Upon the outer face of the head near the top and the bottom longitudinal guides 22 are secured, and in these guides a frame 23 has horizontal movement. The frame 23 is provided with one or more cutters 24 of any suitable description, both side edges of the cutters being sharp or made cutting edges. At the bottom of the frame two pins 25 and 26 are secured, one near each end, and a lever is provided for each pin bearing against its outer side surface, the levers being designated as 28 and 29. These levers at their lower ends are pivoted upon a projection on an apron 27, extending downward from the bottom of the head 12 at the front. Springs 30 and 31 serve to normally keep the levers 28 and 29 in engagement with the pins 25 and 26.

The levers are adapted to operate the cutter-frame 23, and the movement of the levers is controlled by a cam 31ª, placed between them, which cam is shown in Figs. 1, 3, and 5 as of oval shape, being provided upon its rear face, at its heel, with a flange 32, high at the center and tapering from the center in direction of its ends, as shown in Fig. 5.

In connection with the levers 29 and 28 retaining-springs 34 and 33 are provided, the said springs being secured to the apron 27, as shown in Fig. 4, and each retaining-spring terminates at its outer end in a pocket 35. The movement of the cam is regulated, and consequently the movement of the cutter-frame and the weight of material to be cut off, through the medium of a feed mechanism. (Shown in detail in Fig. 6.) The feed mechanism is located at the rear end of a shaft $30^a$, journaled in the standard C, and to the forward end of which the cam $31^a$ is secured. The feed mechanism consists of a ratchet-wheel 36, which is attached to the rear end of the shaft $30^a$, and a lever 37, preferably an elbow-lever, which is pivoted on the shaft $30^a$, one member whereof carries a dog 38, engaging with the teeth of the ratchet-wheel 36. The other member of the lever 37 is adjustably attached to a pitman 39, provided with a series of apertures 40, through one of which a set-screw 41 is passed into an opening in the lever 37. The pitman 39 is pivoted to a wrist-pin secured upon a crank-disk 42, fastened upon a short shaft 43, journaled in a bracket 44, attached to the standard C, and serving also to journal the rear extremity of the shaft $30^a$. The shorter shaft 43 carries a gear 45, which meshes with the gear 15 on the feed-screw shaft, and this shaft may be revolved by hand or by power, as desired. The degree of vibration of the lever 37 and the time of its movement are regulated by adjusting the pitman on said driving-lever, the throw of the crank-disk being unchangeable.

In operation the dough, for example, is placed in the casing and is fed to the hopper and from the hopper into the openings 18 and $18^a$, supposing the levers to be in the position shown in Fig. 1, in which the cam has just released the lever 29 and permitted the spring 31, connected with the lever, to draw it toward the center of the machine, consequently carrying the cutting-frame in direction of the other lever 28, the cutters separating the dough at the openings 18. Just prior to the lever having been released the lever 28 was carried by the cam in an outward direction away from the lever 29, placing its spring 30 under tension and causing the said lever to enter the shoe 35 in the retaining-spring 33. Supposing the cam to have revolved farther, the position of the parts would be that shown in Fig. 3, in which the pointed end of the cam will have carried the lever 29 outward to an engagement with the shoe 35 of the retaining-spring 34, and just about the time that the lever 29 enters its retaining-shoe the flange 23 at the heel of the cam will have pressed the spring 33 rearward, releasing the lever 28 and permitting its spring 30 to act and draw the lever toward the center of the machine, carrying the cutting-frame back to the position it first occupied and producing another cut of the material at the openings 18.

One of the main features of the invention is the screw conveyer 14. This conveyer acts to render the dough close, expelling therefrom any air it may contain, feeding the dough to the cut-off section of the device without the air-bubbles common to dough when worked by hand. The churning that the dough receives by the action of the screw conveyer renders the dough of superior quality.

Having thus described my invention, I claim as new and desire to secure by Letters Patent—

1. In a machine for cutting dough and for similar purposes, a receptacle having an inlet and an outlet, a conveying device in said receptacle, a cutting mechanism located at the outer end of said receptacle, and a regulating device for controlling the movement of said cutting mechanism, substantially as described.

2. In a machine for cutting dough and for similar purposes, a receptacle provided with an inlet and an outlet, means for regulating the area of the outlet, a screw conveyer in said receptacle, a reciprocating cutter mounted to cross the outlet of said receptacle, a device controlling the movement of the cutting mechanism, and means for regulating the movement of said device, substantially as set forth.

3. In a machine for cutting dough and for similar purposes, a receptacle provided with an inlet, and having a tapering nozzle contracted at its outlet end, a head at the outlet end of said receptacle having openings communicating with the nozzle, a slide having movement in grooves formed in the said head and provided with openings adapted to register with the openings in the head, adjustable gates for regulating the size of the openings in the slide, a screw conveyer held to turn in the said receptacle, and a cutting mechanism located at the outlet end of said receptacle, substantially as set forth.

4. In a machine for cutting dough and for similar purposes, a receptacle provided with an inlet, and having a tapering outlet-nozzle contracted at its end, a head at the outlet end of said nozzle provided with openings communicating with the nozzle, means for regulating the area of said openings, a conveyer within said receptacle, a cutting mechanism located at the outlet end of the receptacle, a cam controlling the movement of the cutting mechanism, and a regulating mechanism controlling the movement of the cam, substantially as specified.

5. The combination, with a receptacle, a screw conveyer located in said receptacle, the receptacle being provided with an outlet, of a knife held to move across the outlet for the receptacle, tension-controlled levers connected with the support for said knife, a cam controlling the movement of the levers, and a regulating mechanism controlling the movement of the cam, for the purpose set forth.

6. The combination, with a receptacle, a screw conveyer located therein, the said receptacle being provided with an inlet and an outlet, and a cutter-frame arranged to have movement across the outlet of the receptacle, of spring-controlled levers engaging stops at opposite ends of the cutter-frame, a cam controlling the movement of said levers, and a device regulating the movement of the cam, as and for the purpose specified.

7. The combination, with a screw conveyer, a receptacle containing the screw provided with an outlet and an inlet, means for regulating the area of the outlet, and a cutter-frame mounted to move across the outlet of the feed-receptacle, of levers engaging stops upon the cutter-frame near opposite ends thereof, tension devices normally holding the levers in engagement with the stops, retaining devices adapted to hold the levers in an outer position, and a cam regulating the movement of the levers and operating upon the retaining devices, as and for the purpose specified.

8. The combination, with a feed-receptacle provided with an inlet and an outlet, means for regulating the area of the said outlet, and a cutter-frame mounted to move across the outlet of the feed-receptacle, of levers engaging stops upon the cutter-frame near opposite ends thereof, tension devices normally holding the levers in engagement with the stops, retaining devices adapted to hold the levers and operating upon the retaining devices, and a mechanism for regulating the movement of the cam, said regulating mechanism being driven from the driving device for the feed-receptacle, as and for the purpose specified.

9. The combination, with a receptacle having openings therein, and a cutter-frame mounted to slide over said openings and provided near its ends with stops, of spring-controlled levers engaging with the said stops, retaining-arms terminating in pockets, which pockets are adapted to receive the said levers when in an outer position, a cam located between the said levers, regulating their movement in one direction, the cam being provided with a heel arranged for engagement with the retaining-arms and being adapted to carry the arms from engagement with the said levers, and means for rotating the said cam, for the purpose set forth.

HERMAN WEICHERT.

Witnesses:
J. FRED. ACKER,
EVERARD BOLTON MARSHALL.